United States Patent [19]

Rybicki

[11] 4,261,654
[45] Apr. 14, 1981

[54] AIR GAP TYPE MICROSCOPE OBJECTIVE
[75] Inventor: Edward B. Rybicki, Depew, N.Y.
[73] Assignee: American Optical Corporation, Southbridge, Mass.
[21] Appl. No.: 96,594
[22] Filed: Nov. 21, 1979
[51] Int. Cl.³ .............................................. G02B 3/00
[52] U.S. Cl. ............................................... 350/414
[58] Field of Search ................. 350/175 ML, 215, 177
[56] References Cited

U.S. PATENT DOCUMENTS

3,355,234  11/1967  Muller ............................. 350/176
3,659,923  5/1972  Shoemaker ....................... 350/215

FOREIGN PATENT DOCUMENTS

0244081  12/1965  Fed. Rep. of Germany ........... 350/215

*Primary Examiner*—Paul A. Sacher
*Attorney, Agent, or Firm*—Jeremiah J. Duggan; Alan H. Spencer

[57] ABSTRACT

A six member microscope objective having a numerical aperture of substantially 0.90 and a magnification of substantially 100x for use without oil is disclosed.

3 Claims, 1 Drawing Figure

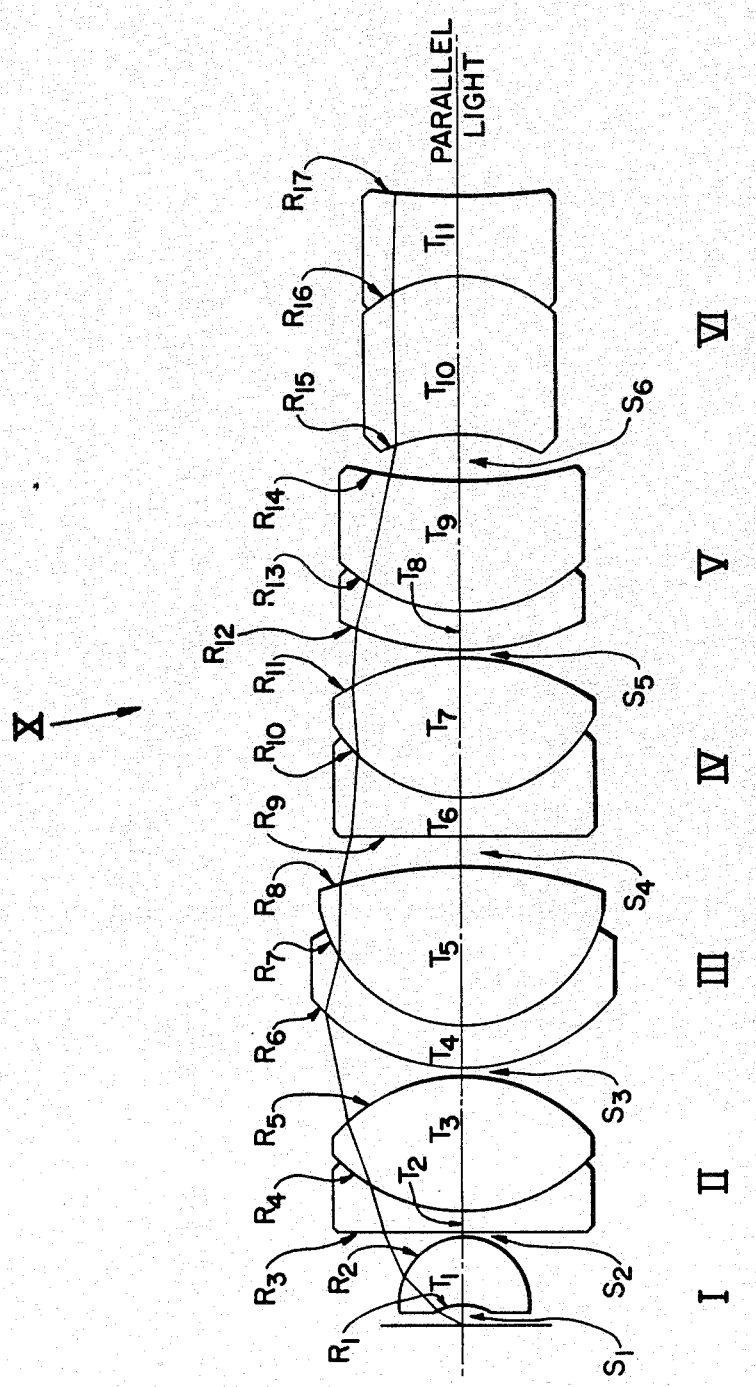

AIR GAP TYPE MICROSCOPE OBJECTIVE

BACKGROUND OF THE INVENTION

This invention relates to improvements in a microscope objective, and in particular to a semi-apochromatic microscope objective with a numerical aperture of substantially 0.90, a magnification of substantially 100×, and a clear working distance of substantially 0.3 millimeters.

It is the object of this invention to provide such a microscope objective in which the usual chromatic image aberrations are exceptionally well corrected, as well as spherical aberration, coma, and astigmatism, while having a substantially flat image over a 20 millimeter field when used with telescope objective as described in U.S. Pat. No. 3,355,234 and a typical 10× eyepiece.

THE DRAWING

The drawing is an optical diagram of an embodiment of the present invention.

THE DESCRIPTION

Referring now to the drawing, the numeral X designates the objective in general, and aligned components of the objective. Component I is a concavo-convex positive singlet. Rearward of component I is component II, a concavo-convex positive doublet, followed respectively by component III, a double-convex positive doublet, component IV, a concavo-convex negative doublet, component V, a convex-concavo positive doublet and component VI, a double-concave negative doublet.

Table I sets forth the lens parameters of the scope of the invention. The axial thicknesses of successive lens elements are designated $T_1$ to $T_{11}$ and the successive axial spaces from object plane O are $S_1$ to $S_6$. The successive lens radii are designated $R_1$ to $R_{17}$ where the minus sign (−) applies to surfaces whose center of curvature lies on the object side of their vertices. The refractive indices and Abbe numbers of the glasses in the successive lenses are designated $ND_1$ to $ND_{11}$, and $\cong_1$ to $\cong_{11}$ respectively.

TABLE I

| Lens | Radius (R) | Thickness (T) | Space (S) | Refractive Index (ND) | Abbe Number ($\nu$) |
|---|---|---|---|---|---|
|  |  |  | $S_1 = 0.268\ f$ |  |  |
| I | $R_1 = -0.909\ f$ | $T_1 = 0.992\ f$ |  | $1.77 < ND_1 < 1.79$ | $35 < \nu_1 < 40$ |
|  | $R_2 = -0.928\ f$ |  |  |  |  |
|  |  |  | $S_2 = -0.027\ f$ |  |  |
|  | $R_3 = 84.089\ f$ | $T_2 = 0.301\ f$ |  | $1.59 < ND_2 < 1.62$ | $53 < \nu_2 < 60$ |
| II | $R_4 = 2.593\ f$ | $T_3 = 1.831\ f$ |  | $1.41 < ND_3 < 1.44$ | $92 < \nu_3 < 97$ |
|  | $R_5 = -2.475\ f$ |  |  |  |  |
|  |  |  | $S_3 = 0.164\ f$ |  |  |
|  | $R_6 = 2.843\ f$ | $T_4 = 0.603\ f$ |  | $1.75 < ND_4 < 1.77$ | $25 < \nu_4 < 30$ |
| III | $R_7 = 2.077\ f$ | $T_5 = 2.193\ f$ |  | $1.41 < ND_5 < 1.44$ | $92 < \nu_5 < 97$ |
|  | $R_8 = -6.192\ f$ |  |  |  |  |
|  |  |  | $S_4 = 0.537\ f$ |  |  |
|  | $R_9 = -63.159$ | $T_6 = 0.548\ f$ |  | $1.77 < ND_6 < 1.79$ | $35 < \nu_6 < 40$ |
| IV | $R_{10} = 2.149\ f$ | $T_7 = 1.918\ f$ |  | $1.41 < ND_7 < 1.44$ | $92 < \nu_7 < 97$ |
|  | $R_{11} = -3.256\ f$ |  |  |  |  |
|  |  |  | $S_5 = 0.054\ f$ |  |  |
|  | $R_{12} = 3.942\ f$ | $T_8 = 0.548\ f$ |  | $1.68 < ND_8 < 1.71$ | $28 < \nu_8 < 34$ |
| V | $R_{13} = 2.522\ f$ | $T_9 = 1.809\ f$ |  | $1.70 < ND_9 < 1.74$ | $35 < \nu_9 < 40$ |
|  | $R_{14} = 6.524\ f$ |  |  |  |  |
|  |  |  | $S_6 = 0.751\ f$ |  |  |
|  | $R_{15} = -2.741\ f$ | $T_{10} = 2.193\ f$ |  | $1.77 < ND_{10} < 1.79$ | $24 < \nu_{10} < 29$ |
| VI | $R_{16} = -2.077$ | $T_{11} = 1.096\ f$ |  | $1.61 < ND_{11} < 1.64$ | $55 < \nu_{11} < 60$ |
|  | $R_{17} = 10.344\ f$ |  |  |  |  |

The indices and Abbe numbers are absolute values and f has a value between 1.75 and 2.00 mm.

Numerically stated, the constructional data for one successful form of the invention is given below where f=1.82395 mm.

TABLE II

| Lens | Radius (R) | Thickness (T) | Space (S) | Refractive Index (ND) | Abbe Number ($\nu$) |
|---|---|---|---|---|---|
|  |  |  | $S_1 = 0.49$ |  |  |
| I | $R_1 = -1.659$ | $T_1 = 1.81$ |  | $ND_1 = 1.781607$ | $\nu_1 = 37.08$ |
|  | $R_2 = -1.693$ |  |  |  |  |
|  |  |  | $S_2 = 0.05$ |  |  |

TABLE II-continued

| Lens | Radius (R) | Thickness (T) | Space (S) | Refractive Index (ND) | Abbe Number (ν) |
|---|---|---|---|---|---|
|  | $R_3 = -153.375$ |  |  |  |  |
|  |  | $T_2 = 0.55$ |  | $ND_2 = 1.607286$ | $\nu_2 = 56.65$ |
| II | $R_4 = 4.73$ |  |  |  |  |
|  |  | $T_3 = 3.34$ |  | $ND_3 = 1.433843$ | $\nu_3 = 95.60$ |
|  | $R_5 = -4.515$ |  |  |  |  |
|  |  |  | $S_3 = 0.3$ |  |  |
|  | $R_6 = 5.187$ |  |  |  |  |
|  |  | $T_4 = 1.1$ |  | $ND_4 = 1.761555$ | $\nu_4 = 27.10$ |
| III | $R_7 = 3.79$ |  |  |  |  |
|  |  | $T_5 = 4.0$ |  | $ND_5 = 1.433843$ | $\nu_5 = 95.60$ |
|  | $R_8 = -11.295$ |  |  |  |  |
|  |  |  | $S_4 = 0.98$ |  |  |
|  | $R_9 = -115.2$ |  |  |  |  |
|  |  | $T_6 = 1.0$ |  | $ND_6 = 1.781607$ | $\nu_6 = 37.08$ |
| IV | $R_{10} = 3.92$ |  |  |  |  |
|  |  | $T_7 = 3.5$ |  | $ND_7 = 1.433843$ | $\nu_7 = 95.60$ |
|  | $R_{11} = -5.94$ |  |  |  |  |
|  |  |  | $S_5 = 0.1$ |  |  |
|  | $R_{12} = 7.19$ |  |  |  |  |
|  |  | $T_8 = 1.0$ |  | $ND_8 = 1.698749$ | $\nu_8 = 30.06$ |
| V | $R_{13} = 4.6$ |  |  |  |  |
|  |  | $T_9 = 3.3$ |  | $ND_9 = 1.723254$ | $\nu_9 = 37.94$ |
|  | $R_{14} = 11.9$ |  |  |  |  |
|  |  |  | $S_6 = 1.37$ |  |  |
|  | $R_{15} = -5.0$ |  |  |  |  |
|  |  | $T_{10} = 4.0$ |  | $ND_{10} = 1.784443$ | $\nu_{10} = 26.21$ |
| VI | $R_{16} = -3.79$ |  |  |  |  |
|  |  | $T_{11} = 2.0$ |  | $ND_{11} = 1.622896$ | $\nu_{11} = 58.13$ |
|  | $R_{17} = 18.867$ |  |  |  |  |

What is claimed is:

1. A semi-apochromatic air gap microscope objective having a magnification of substantially 100× and a numerical aperture of substantially 0.90 for forming an image of an object plane, said image being well corrected for spherical and chromatic aberrations, coma, astigmatism and curvature of image field, said objective comprising:

a front concavo-convex positive singlet lens component I;

a second concavo-convex positive doublet lens component II;

a third double-convex positive doublet lens component III;

a fourth concavo-convex negative doublet lens component IV;

a fifth convex-concavo positive doublet lens component V; and a sixth double-concave negative doublet lens component VI;

all of said lens components being axially aligned.

2. The objective of claim 1 having the following lens parameters where a minus sign (−) designates a surface curvature having a vertex on the object side of the surface, wherein f is between 1.75 and 2.00 mm, and

TABLE I

| Lens | Radius (R) | Thickness (T) | Space (S) | Refractive Index (ND) | Abbe Number (ν) |
|---|---|---|---|---|---|
|  |  |  | $S_1 = 0.268\ f$ |  |  |
|  | $R_1 = -0.909\ f$ |  |  |  |  |
| I |  | $T_1 = 0.992\ f$ |  | $1.77 < ND_1 < 1.79$ | $35 < \nu_1 < 40$ |
|  | $R_2 = -0.928\ f$ |  |  |  |  |
|  |  |  | $S_2 = -0.027\ f$ |  |  |
|  | $R_3 = 84.089\ f$ |  |  |  |  |
|  |  | $T_2 = 0.301\ f$ |  | $1.59 < ND_2 < 1.62$ | $53 < \nu_2 < 60$ |
| II | $R_4 = 2.593\ f$ |  |  |  |  |
|  |  | $T_3 = 1.831\ f$ |  | $1.41 < ND_3 < 1.44$ | $92 < \nu_3 < 97$ |
|  | $R_5 = -2.475\ f$ |  |  |  |  |
|  |  |  | $S_3 = 0.164\ f$ |  |  |
|  | $R_6 = 2.843\ f$ |  |  |  |  |
|  |  | $T_4 = 0.603\ f$ |  | $1.75 < ND_4 < 1.77$ | $25 < \nu_4 < 30$ |
| III | $R_7 = 2.077\ f$ |  |  |  |  |
|  |  | $T_5 = 2.193\ f$ |  | $1.41 < ND_5 < 1.44$ | $92 < \nu_5 < 97$ |
|  | $R_8 = -6.192\ f$ |  |  |  |  |
|  |  |  | $S_4 = 0.537\ f$ |  |  |
|  | $R_9 = -63.159\ f$ |  |  |  |  |
|  |  | $T_6 = 0.548\ f$ |  | $1.77 < ND_6 < 1.79$ | $35 < \nu_6 < 40$ |
| IV | $R_{10} = 2.149\ f$ |  |  |  |  |
|  |  | $T_7 = 1.918\ f$ |  | $1.41 < ND_7 < 1.44$ | $92 < \nu_7 < 97$ |
|  | $R_{11} = -3.256\ f$ |  |  |  |  |
|  |  |  | $S_5 = 0.054\ f$ |  |  |
|  | $R_{12} = 3.942\ f$ |  |  |  |  |
|  |  | $T_8 = 0.548\ f$ |  | $1.68 < ND_8 < 1.71$ | $28 < \nu_8 < 34$ |
| V | $R_{13} = 2.522\ f$ |  |  |  |  |

TABLE I-continued

| Lens | Radius (R) | Thickness (T) | Space (S) | Refractive Index (ND) | Abbe Number ($\nu$) |
|---|---|---|---|---|---|
| | | $T_9 = 1.809\ f$ | | $1.70 < ND_9 < 1.74$ | $35 < \nu_9 < 40$ |
| | $R_{14} = 6.524\ f$ | | $S_6 = 0.751\ f$ | | |
| | $R_{15} = -2.741\ f$ | $T_{10} = 2.193\ f$ | | $1.77 < ND_{10} < 1.79$ | $24 < \nu_{10} < 29$ |
| VI | $R_{16} = -2.077$ | $T_{11} = 1.096\ f$ | | $1.61 < ND_{11} < 1.64$ | $55 < \nu_{11} < 60$ |
| | $R_{17} = 10.344\ f$ | | | | |

3. The objective of claim 2 having the following lens parameters where a minus sign (−) designates a surface curvature having a vertex on the object side of the surface, wherein f is between 1.75 and 2.00 mm, and

TABLE II

| Lens | Radius (R) | Thickness (T) | Space (S) | Refractive Index (ND) | Abbe Number ($\nu$) |
|---|---|---|---|---|---|
| | | | $S_1 = 0.49$ | | |
| | $R_1 = -1.659$ | | | | |
| I | | $T_1 = 1.81$ | | $ND_1 = 1.781607$ | $\nu_1 = 37.08$ |
| | $R_2 = -1.693$ | | | | |
| | | | $S_2 = 0.05$ | | |
| | $R_3 = -153.375$ | | | | |
| | | $T_2 = 0.55$ | | $ND_2 = 1.607286$ | $\nu_2 = 56.65$ |
| II | $R_4 = 4.73$ | | | | |
| | | $T_3 = 3.34$ | | $ND_3 = 1.433843$ | $\nu_3 = 95.60$ |
| | $R_5 = -4.515$ | | | | |
| | | | $S_3 = 0.3$ | | |
| | $R_6 = 5.187$ | | | | |
| | | $T_4 = 1.1$ | | $ND_4 = 1.761555$ | $\nu_4 = 27.10$ |
| III | $R_7 = 3.79$ | | | | |
| | | $T_5 = 4.0$ | | $ND_5 = 1.433843$ | $\nu_5 = 95.60$ |
| | $R_8 = -11.295$ | | | | |
| | | | $S_4 = 0.98$ | | |
| | $R_9 = -115.2$ | | | | |
| | | $T_6 = 1.0$ | | $ND_6 = 1.781607$ | $\nu_6 = 37.08$ |
| IV | $R_{10} = 3.92$ | | | | |
| | | $T_7 = 3.5$ | | $ND_7 = 1.433843$ | $\nu_7 = 95.60$ |
| | $R_{11} = -5.94$ | | | | |
| | | | $S_5 = 0.1$ | | |
| | $R_{12} = 7.19$ | | | | |
| | | $T_8 = 1.0$ | | $ND_8 = 1.698749$ | $\nu_8 = 30.06$ |
| V | $R_{13} = 4.6$ | | | | |
| | | $T_9 = 3.3$ | | $ND_9 = 1.723254$ | $\nu_9 = 37.94$ |
| | $R_{14} = 11.9$ | | | | |
| | | | $S_6 = 1.37$ | | |
| | $R_{15} = -5.0$ | | | | |
| | | $T_{10} = 4.0$ | | $ND_{10} = 1.784443$ | $\nu_{10} = 26.21$ |
| VI | $R_{16} = -3.79$ | | | | |
| | | $T_{11} = 2.0$ | | $ND_{11} = 1.622896$ | $\nu_{11} = 58.13$ |
| | $R_{17} = 18.867$ | | | | |

* * * * *

UNITED STATES PATENT AND TRADEMARK OFFICE
CERTIFICATE OF CORRECTION

PATENT NO. : 4,261,654
DATED : April 14, 1981
INVENTOR(S) : E. B. Rybicki

It is certified that error appears in the above-identified patent and that said Letters Patent are hereby corrected as shown below:

In column 2, line 20, delete "$\geq_1$" and insert --$\nu_1$--.

In column 2, line 21, delete "$\geq_{11}$" and insert --$\nu_{11}$--.

Signed and Sealed this

*Seventh* Day of *July 1981*

[SEAL]

*Attest:*

RENE D. TEGTMEYER

*Attesting Officer*  *Acting Commissioner of Patents and Trademarks*